United States Patent
Gershaft et al.

(10) Patent No.: US 10,432,471 B2
(45) Date of Patent: Oct. 1, 2019

(54) DISTRIBUTED COMPUTING DEPENDENCY MANAGEMENT SYSTEM

(71) Applicant: MICROSOFT TECHNOLOGY LICENSING, LLC, Redmond, WA (US)

(72) Inventors: Aleksandr Mikhailovich Gershaft, Redmond, WA (US); Weiping Hu, Bellevue, WA (US); Marwan E. Jubran, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 458 days.

(21) Appl. No.: 15/243,741

(22) Filed: Aug. 22, 2016

(65) Prior Publication Data

US 2017/0195183 A1    Jul. 6, 2017

Related U.S. Application Data

(60) Provisional application No. 62/274,102, filed on Dec. 31, 2015.

(51) Int. Cl.
*G06F 15/173* (2006.01)
*H04L 12/24* (2006.01)
(Continued)

(52) U.S. Cl.
CPC ............ *H04L 41/12* (2013.01); *G06Q 10/06* (2013.01); *H04L 41/06* (2013.01); *H04L 41/145* (2013.01); *H04L 41/22* (2013.01); *H04L 67/10* (2013.01)

(58) Field of Classification Search
None
See application file for complete search history.

(56) References Cited

U.S. PATENT DOCUMENTS 7,509,518 B2   3/2009   Bailey et al.
8,219,663 B2   7/2012   Faraldo
(Continued)

OTHER PUBLICATIONS

Bartlett, Neil, "Getting Started with OSGi: Declarative Services and Dependencies", Published on: Jun. 20, 2007 Available at: http://www.eclipsezone.com/eclipse/forums/t97690.rhtml.
"Declaring your services to OSGi Declarative Services", Retrieved on: Dec. 23, 2015 Available at: https://www-01.ibm.com/support/knowledgecenter/SSEQTP_8.5.5/com.ibm.websphere.wlp.doc/ae/twlp_declare_services_ds.html.
"Entity Framework", Retrieved on: Dec. 28, 2015 Available at: https://msdn.microsoft.com/en-US/data/ef.
(Continued)

*Primary Examiner* — Mohamed Ibrahim
(74) *Attorney, Agent, or Firm* — Shook, Hardy & Bacon, L.L.P.

(57) ABSTRACT

Various methods and systems for implementing dependency management for an infrastructure are provided. A dependency service manager of the dependency management system includes a plurality of dependency management system components that facilitate automatically discovering and analyzing data to generate dependency data. The dependency data includes dependencies and dependents of dependency service tenants which are tenant services of the infrastructure. The dependency data is generated based on data retrieved by a plurality of collectors. A collector from the plurality of collectors is an agent that retrieves data associated with dependency service tenants based on a corresponding collection time attribute of the collector. A collector accesses data for generating the dependency data at one of the following collection times: design time, deployment time and runtime. The dependency data that is generated is then stored in a data store and communicated to a dependency service interface for user access to the dependency data.

20 Claims, 9 Drawing Sheets

(51) Int. Cl.
*H04L 29/08* (2006.01)
*G06Q 10/06* (2012.01)

(56) References Cited

U.S. PATENT DOCUMENTS

| | | | |
|---|---|---|---|
| 8,732,654 | B2 | 5/2014 | Venkataraman et al. |
| 8,996,779 | B2 | 3/2015 | Bostick et al. |
| 9,557,879 | B1* | 1/2017 | Wang .................... G06F 3/0481 |
| 2004/0046785 | A1 | 3/2004 | Keller |
| 2005/0172306 | A1* | 8/2005 | Agarwal ............... G06F 11/008 |
| | | | 719/328 |
| 2008/0276221 | A1* | 11/2008 | Lev ......................... G06F 8/74 |
| | | | 717/120 |
| 2009/0055888 | A1 | 2/2009 | Little |
| 2009/0198531 | A1* | 8/2009 | Belvin .................. G06Q 10/06 |
| | | | 705/301 |
| 2011/0246635 | A1 | 10/2011 | Phukan |
| 2012/0072887 | A1* | 3/2012 | Basak ................... G06F 11/323 |
| | | | 717/123 |
| 2012/0131193 | A1 | 5/2012 | Ferris et al. |
| 2012/0180041 | A1 | 7/2012 | Fletcher |
| 2013/0346619 | A1 | 12/2013 | Panuganty et al. |
| 2014/0019611 | A1 | 1/2014 | Weavind et al. |
| 2014/0351372 | A1 | 11/2014 | Xu et al. |

OTHER PUBLICATIONS

Wegner, Wade, "Getting Started with Windows Server AppFabric Cache", Published on: Aug. 13, 2010 Available at: http://www.wadewegner.com/2010/08/getting-started-with-windows-server-appfabric-cache/.

"Second Written Opinion Issued in PCT Application No. PCT/US2016/068607", dated Jun. 29, 2017, 6 Pages.

Menzel, et al., "A Configuration Crawler for Virtual Appliances in Compute Clouds", In Proceedings of 2013 IEEE International Conference on Cloud Engineering (IC2E), Mar. 25, 2013, pp. 201-209.

"International Search Report and Written Opinion Issued in PCT Application No. PCT/US2016/068607", dated Mar. 6, 2017, 11 Pages.

Sangpetch, et al., "VDEP: VM Dependency Discovery in Multi-tier Cloud Applications", In Proceedings of 2015 IEEE 8th International Conference on Cloud Computing (CLOUD), Jun. 27, 2015, pp. 694-701.

"International Preliminary Report on Patentability Issued in PCT Application No. PCT/US2016/068607", dated Sep. 27, 2017, 7 Pages.

* cited by examiner

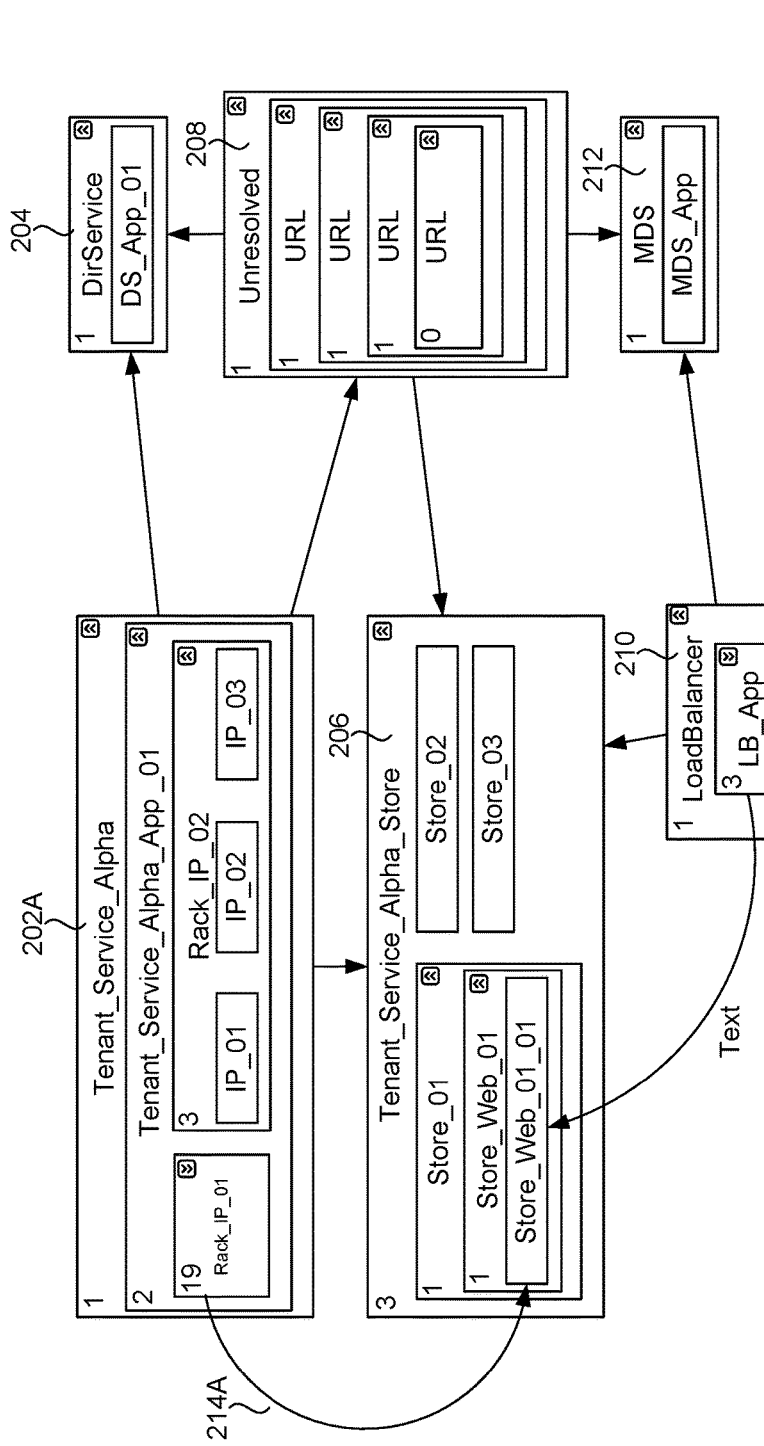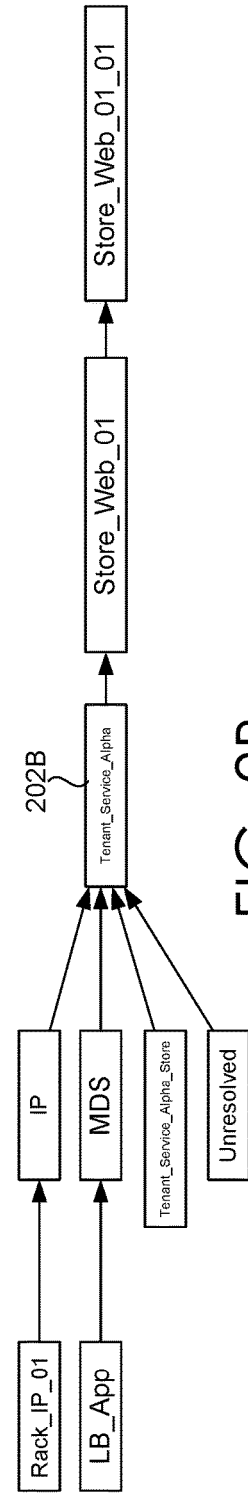
FIG. 2A
FIG. 2B

DISTRIBUTED COMPUTING DEPENDENCY MANAGEMENT SYSTEM

This application claims priority to U.S. Provisional Application Ser. No. 62/274,102, filed Dec. 31, 2015, entitled "DISTRIBUTED COMPUTING DEPENDENCY MANAGEMENT SYSTEM," which is incorporated herein by reference in its entirety.

BACKGROUND

Large-scale networked systems are commonplace platforms employed in a variety of settings for running applications and maintaining data for business and operational functions. For instance, a data center (e.g., physical cloud computing platform) may provide a variety of services (e.g., web applications, email services, search engine services, etc.) for a plurality of customers simultaneously. These large-scale networked systems typically include a large number of resources distributed throughout the data center or throughout multiple data centers in a region or multiple regions across the globe. Resources can resemble a physical machine or a virtual machine (VM) running on a physical node or host. The data center runs on hardware (e.g., power supplies, racks, and Network Interface Controllers (NIC)) and software components (Applications, Application Programming Interfaces (APIs), SQL Databases) that rely on each other to operate. In particular, services that include one or more components operate based on dependencies with one another. Services are often managed independently by different teams with often ad hoc approaches for resolving dependency issues that arise with other components.

SUMMARY

Embodiments described herein provide methods and systems for implementing a dependency management system for an infrastructure (e.g., distributed computing infrastructure). At a high level, dependency management facilitates automatically discovering, building and analyzing dependencies for tenant services in an infrastructure. A dependency service manager of the dependency management system includes a plurality of dependency management system components (e.g., collectors, a standard name provider and a dependency aggregator) that facilitate generating dependency data. The dependency data includes dependencies and dependents of dependency service tenants which are tenant services of the infrastructure. The dependency service tenants are associated with the dependency management system. The dependency data is generated based on data retrieved by a plurality of collectors. A collector from the plurality of collectors is an agent that retrieves data associated with dependency service tenants of the infrastructure based on a corresponding collection time attribute of the collector. A collector accesses data for generating the dependency data at one of the following collection times: design time, deployment time and runtime. The dependency service manager operates to crosscheck data collected by the plurality collectors and generate relations between dependency service tenants and corresponding dependency and dependent components.

The dependency data that is generated is then stored in a data store and communicated to a dependency service interface for user access to the dependency data. In embodiments, the infrastructure includes an on-premise infrastructure that syncs the dependency data. The dependency service interface supports providing different views of the dependency data to allow user access and analysis of the dependency data. The dependency data is also accessible via a data graph representation; the data graph representation provides an alternate access and functional view of the dependency data. The dependency data presented via the dependency service interface or data graph representation can further be used to perform dependency service operations for the infrastructure.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein:

FIGS. 2A-2B are exemplary graphical representations of dependency data, in accordance with embodiments described herein;

DETAILED DESCRIPTION

Figure 1A:
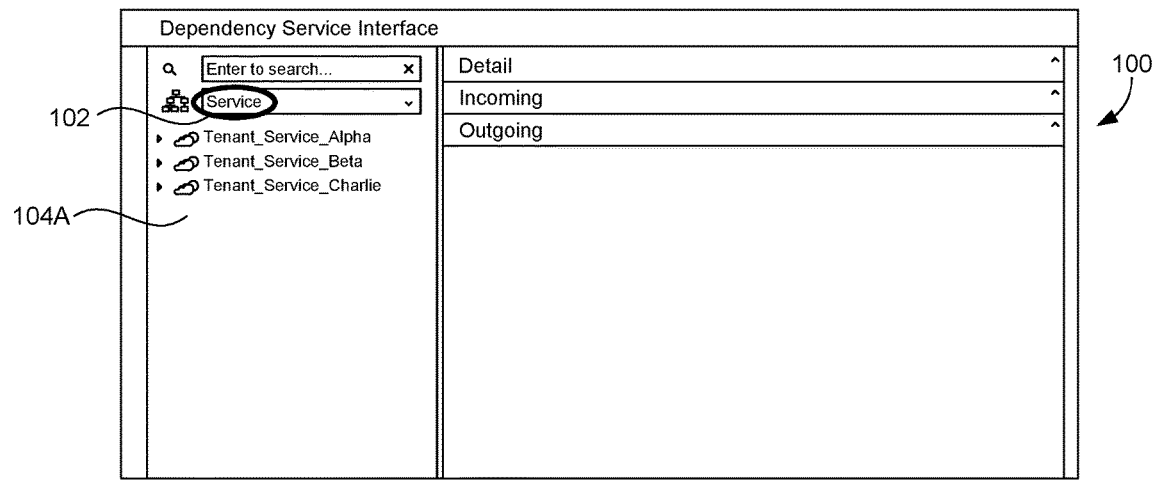
FIGS. 1A-1C are exemplary dependency service interfaces for accessing dependency data, in accordance with embodiments described herein.

A distributed computing infrastructure (e.g., a cloud computing infrastructure) can offer building, deployment and management functionality for different types of applications and services. The distributed computing infrastructure can include several physical and virtual resources that facilitate providing cloud-based computing functionality. For example, a data center includes a number of distributed resources including physical machines or a virtual machine (VM) running on a physical node or host. The data center runs on hardware (e.g., power supplies, racks, and Network Interface Controllers (NIC)) and software components (Applications, Application Programming Interfaces (API), SQL Databases) that rely on each other to operate. The distributed computing infrastructure can be monitored and managed using a distributed computing platform kernel (e.g., a fabric controller ("FC")). The distributed computing infrastructure can also include an on-premise infrastructure (e.g., a tenant of the distributed computing infrastructure) where services and applications functionally extend into for performing operations on-premise.

Generally, services in the distributed computing infrastructure that include one or more components operate based on dependencies with one another. Services are often managed independently by different teams with often ad hoc approaches to resolving dependency issues that arise with other components. Moreover, some teams operate services running in virtualized environments and may not know the dependencies on physical resources (e.g., network devices, power devices, or generators). With the differing approaches for addressing dependency management, determining what dependencies exist, communicating dependencies and resolving dependency issues can present challenges for a distributed computing infrastructure. As such, a comprehensive system for configuring, identifying and communicating dependencies between distributed computing infrastructure components can improve the assessment, understanding and reliability of the distributed computing infrastructure.

Embodiments of the present invention are directed to efficient methods and systems for dependency management. The dependency management system can be implemented as a service or application (hereinafter "dependency service") in a distributed computing infrastructure. At a high level, dependency management facilitates automatically discovering, building and analyzing dependencies for tenant services in an infrastructure. A dependency service manager of the dependency management system includes a plurality of dependency management system components (e.g., collectors, a standard name provider and a dependency aggregator) that facilitate generating dependency data. The dependency data includes dependencies and dependents of dependency service tenants which are tenant services of the infrastructure. The dependency service tenants are associated with the dependency management system. The dependency data is generated based on data retrieved by a plurality of collectors. A collector from the plurality of collectors is an agent that retrieves data associated with dependency service tenants of the infrastructure based on a corresponding collection time attribute of the collector. A collector accesses data for generating the dependency data at one of the following collection times: design time, deployment time and runtime. The dependency service manager operates to crosscheck data collected by the plurality collectors and generate relations between dependency service tenants and corresponding dependency and dependent components.

The dependency data can be leveraged for dependency service operations. Advantageously, the generated dependency data enables verifying a declarative service dependency model of the dependency management system, alerting missing dependencies, suppressing notification noise and other operations such as helping incident impact analysis. Analysis services (i.e., verifying the declarative service dependency model, alerting missing dependencies, and suppressing notification noise) can be further used to verify and extend each other. The dependency data further helps developers understand dependencies and prioritize service recovery by introducing a recovery path and integrating with recovery workflows.

The particular services and components that are supported and discovered by the dependency service can be referred to as dependency service tenants. A dependency service tenant can be associated with an administrator, owner, operator or client of the dependency service tenant. A dependency service tenant can be implemented as one or more instances of a dependency service tenant. A tenant name can be associated with a dependency service tenant; however the tenant name is not necessarily a global unique identifier (GUID) but a more meaningful name.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention.

ALMap Application Layer Map—static (build time) declaration of service layering order
CS Configuration Store—repository of configurations/settings
DNS Domain Name Service
FC Fabric Controller dependency graph
MA Monitoring Agent—agent deployed within service
MDS Monitoring and Diagnostic Service—analysis service for monitoring and diagnostic data
SVD Service Model Definition—design time
TFS Team Foundation Server
VIP Virtual IP address The dependency management system can support graphical user interfaces that facilitate accessing and interacting with features and functionality supported by the dependency system. The dependency data is accessible via a data graph representation. The dependency data can be generated and stored in a data store and communicated to a dependency service interface for user access to the dependency data. The dependency data can further be provided through APIs (Application Programming Interface) for other services to utilize (e.g., an alert suppression service can plug into dependency data APIs to suppress alerts that are coming from services that depend on a failing service). In an exemplary embodiment, the dependency management system may include a web frontend ("FE") that provides users the ability to visualize both the dependencies for a given dependency service tenant and the dependent (impacted) services of the dependency service tenant. The dependency management system discovers the components or services within the components that a dependency tenant service depends on, along with other dependencies. For instance, if a dependency service tenant depends on storage, the dependency service further identifies and exposes storage accounts and certificates associated with the dependency service tenant.

Figure 1B:
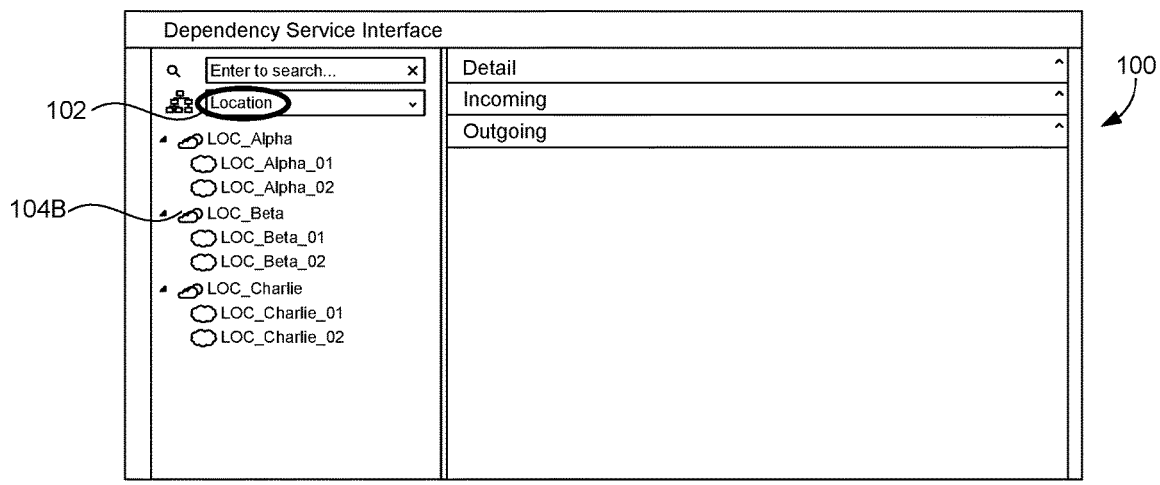
Figure 1C:
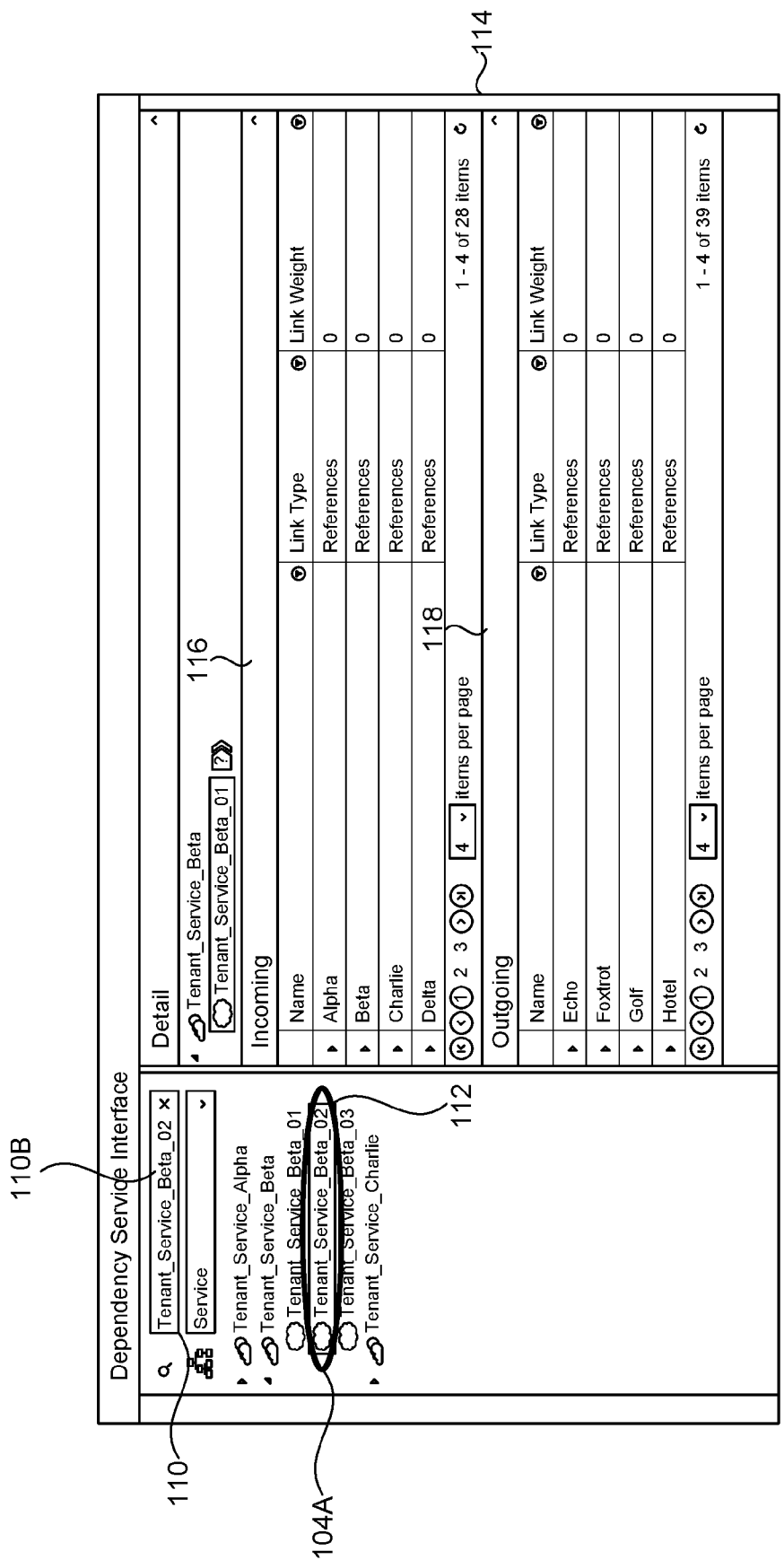

The dependency management system supports different types of viewing experiences to provide access to the dependency data. The dependency management system can communicate dependency data to a dependency service interface that is generated on a display. The dependency management system can also support a data graph representation of the dependency data, as discussed herein in more detail. With reference to FIGS. 1A-1C, an exemplary dependency service interface 100 (e.g., portal) is provided. The dependency service interface 100 may be a portal for communicating information configured and implemented via the dependency management system. The dependency service interface 100 can support selectable views for presenting and accessing the dependency data. Within each view, the user can browse a collection of dependency information, aggregate, and order the dependencies (and resources). The views aggregate common services; however, the user should be able to see individual service dependencies. By way of example, a portal can include two views to present the dependency information: a "dependency by service" view and a "dependency by location" view. The dependency by service view can operate as a logical view that helps the user investigate the impact of a service failure. The view pivots towards component owner or single-service failure. As shown in FIG. 1A, a selectable dropdown 102 can be provided via the dependency service interface 100 to select a dependency by service view. Selecting the dependency by service populates a dependency information portion 104A of the dependency service interface 100 with dependency information of services (e.g., Tenant_Service_Alpha; Tenant_Service_Beta; and Tenant_Service_Charlie). A dependency service information can be provided in a tree like hierarchical structure (e.g., Tenant_Service_Beta_02 112 shown in a tree hierarchy under Tenant_Service_Beta)

The dependency by location view can operate as a physical view that helps administrators investigate the impact of a physical location (such as datacenter loss) or logical location (such as an update domain, or fault domain). As shown in FIG. 1B, a selectable dropdown 102 can be provided via the dependency service interface 100 to select a dependency by location view. Selecting the dependency by location view populates a dependency information portion 104B of the dependency service interface 100 with a dependency information of services based on location (e.g., LOC_Alpha; LOC_Beta; and LOC_Charlie).

The dependency management system supports different types of dependency exploration experiences to perform analysis on the dependency data. A feature of dependency analysis is to find one or more services of interest. As such, to adequately support dependency exploration, the following exploration capabilities are made available via the dependency management system: In an exemplary embodiment, with reference to FIG. 1C, the dependency service interface 100 includes a dependency search bar 110 that supports identifying dependency information of a service that is searched. Dependency information can further include details of dependency services portion 114 that populates incoming relations and outgoing relations in corresponding incoming relations portion 116 and outgoing relations portion 118 of the dependency interface 100. By way of example, a user can search for a specific tenant by name (e.g., Tenant_Service_Beta_02 110B) and dependency information including a listing of tenant services which depend on the searched Tenant_Service_Beta_02 (i.e., incoming relations) and a listing of tenant services that the searched Tenant_Service_Beta_02 (i.e., outgoing relations) are generated. A user can search for a group of services by name. A user can then explore the tenants by location or hierarchy.

The dependency management system supports different types of dependency annotation experiences to perform analysis on the dependency data. The dependency management system is configured to detect and annotate each dependency with appropriate service name and resolve all of the dependencies. It is possible that there may be missing links or failure to resolve a dependency name, such as utility machines, and external services to the infrastructure. The dependency management system provides a way to define a new service instance and one or more service grouping rules. A component team (owning the service) can annotate the dependency model (e.g. control plane, operational plane and data plane) and direction of the edge. The dependency management may store this information and apply it to all instances of the tenant service. The component team can leverage the dependency graph as part of the design review process to rationalize the set of dependencies and arrive at an optimal architecture.

The dependency management system supports a portal (e.g., frontend website) to view dependency information which can be hosted on premise and/or in the cloud. The dependency data for the website may come from SQL (SQL Azure or Local SQL with automatic fail-over) to ensure the site is always available. The website can be implemented to ensure high availability. It is contemplated that as part of the portal or independently of the portal a data graph representation of the dependency data is made accessible. The dependency management system further supports a Web-API that can be accessed programmatically to retrieve dependency data for a given dependency service tenant.

The data graph operates as a diagrammatical illustration of the dependency data that provides a visual representation of the dependency data for further analysis. For example, a user can download a full graph or a partial graph as a file for detailed analysis. The data graph representation can be based on an extensible markup language representation of directed graphs. For example, the data graph can be in directed graph markup language (DGML) file format that allows a user via the portal or other application to explore the dependency graph interactively to understand the underlying links that the analysis have detected. An application supporting view the data graph representation can support different types of modes to allow for flexibility in viewing the data graph representation. For example, for larger graphs, different modes can provide an aggregated view of dependencies.

By way of example, FIGS. 2A and 2B illustrate data graph representations of an exemplary dependency management system. In particular, FIG. 2A is a partial graph representation of several different dependency tenant services including their dependents and dependencies. The data graph in FIG. 2A includes dependency tenant services 202A, 204, 206, 208 210 and 212. The links (e.g., link 214A) show direct dependencies and facilitate analysis for understanding activities between Rack_IP_01 and Store_Web_01_01. The services and links can further be annotated to provide additional details within the data graph view. In FIG. 2B, an alternative view of the data graph can provide access to the dependency data. For example, the FIG. 2B include the Tenant_Service_Alpha (202B) that corresponds to the Tenant_Service_Alpha (202A) and illustrating dependents and dependencies of Tenant_Service_Alpha in another view. Other variations and combinations of data graph views of dependency data are contemplated with embodiments described herein.

Figure 3A:
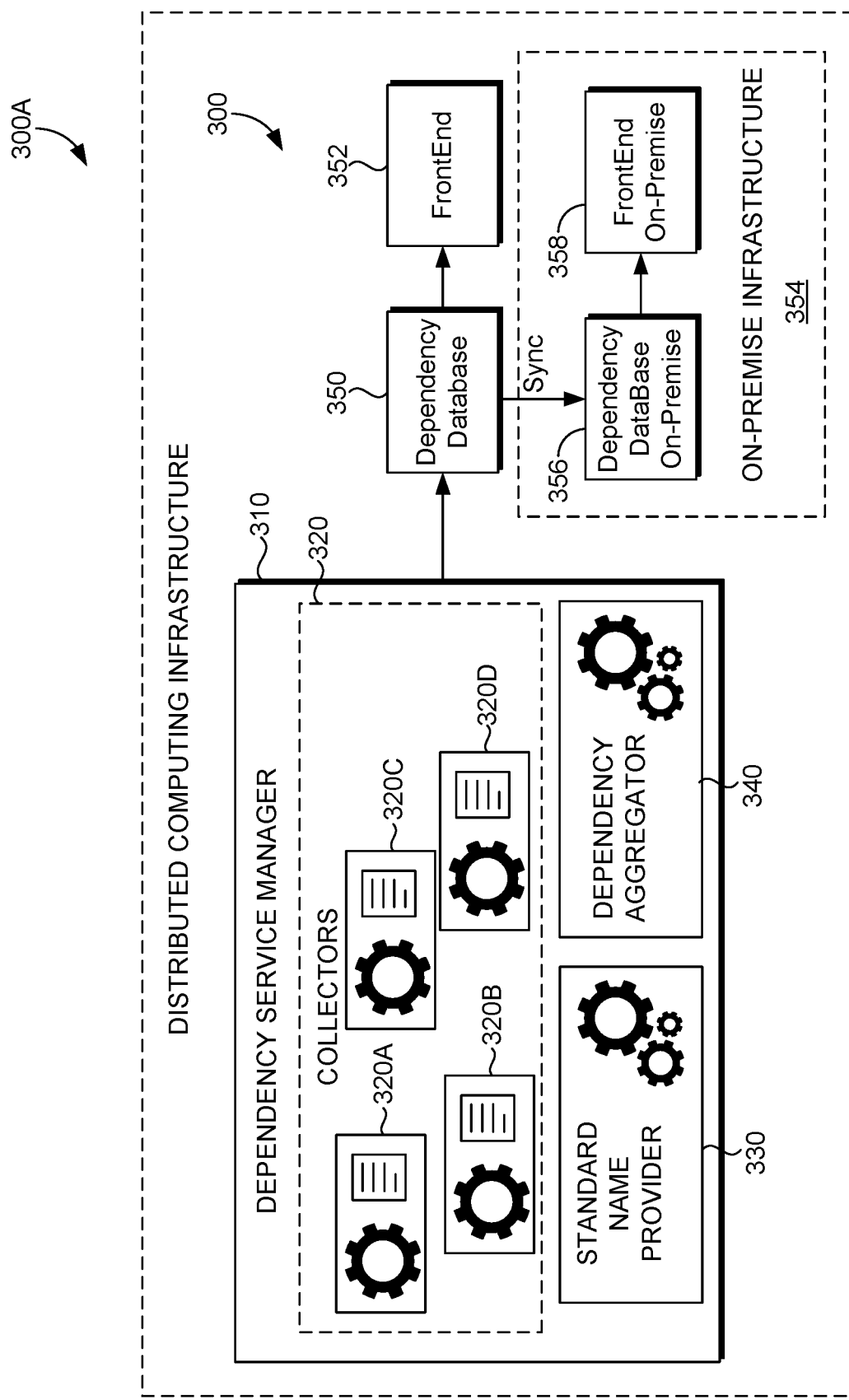
FIG. 3A is a block diagram of an exemplary distributed computing infrastructure and dependency management system, in which embodiments described herein may be employed.

With reference to FIG. 3A, embodiments of the present disclosure can be discussed with reference to an exemplary distributed computing infrastructure 300A that is an operating environment for implementing functionality described herein of a dependency management system 300. The dependency management system 300 includes a dependency service manager 310, a plurality of collectors 320 (320A, 320B, 320C and 320D), a standard name provider 330, a dependency aggregator 340, a dependency data store 350, and a frontend 352.

A system, as used herein, refers to any device, process, or service or combination thereof. A system may be implemented using components as hardware, software, firmware, a special-purpose device, or any combination thereof. A system may be integrated into a single device or it may be distributed over multiple devices. The various components of a system may be co-located or distributed. The system may be formed from other systems and components thereof. It should be understood that this and other arrangements described herein are set forth only as examples.

Having identified various components of the distributed computing environments, it is noted that any number of components may be employed to achieve the desired functionality within the scope of the present disclosure. The various components of FIG. 3A are shown with lines for the sake of clarity. Further, although some components of FIG. 3A are depicted as single components, the depictions are exemplary in nature and in number and are not to be construed as limiting for all implementations of the present disclosure. The dependency management system functionality can be further described based on the functionality and features of the above-listed components.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

In operation, the dependency service manager 310 of the dependency management system 300 supports an analysis pipeline and utilizes the data in a defined flow to refine the dependency data appropriately. The data that is used in the analysis and generation of the dependency data is retrieved using the plurality of collectors 320. A collector is configured to retrieve the information or data about the services. Collectors target the collection of information at design time, runtime, and deployment time. A collector can be associated with a collection time (e.g., via a collection time attribute) such that the collector retrieves data based on the particular collection time. Collectors can also annotate any collected data at the time of collection to provide a historical view of the collected data.

There are several different types of collection times or phases that the plurality of collectors 320 can support. Design time collection supports understanding dependencies between modules and type of services (e.g. usage of client libraries or common library usage). Design time collection can include static dependency analysis, layer mapping, and fault model analysis. Static dependency analysis refers to a technique for determining dependencies between program binaries. Static dependency analysis is done by analyzing the binaries used, referenced or included in the package. These dependencies suggest dependencies on services but not dependencies of specific instances of services. Layer mapping refers to a grouping of services into a hierarchical structure that allows for proper layering between services (e.g., lower level services do not depend on higher-level services). The layer mapping can support validating the data graph representation and ensure proper design. A layer map is a model of the dependencies between program binaries, and may not be an exact representation. A fault model is a template that describes the various ways a program can fail at runtime, and the impact of such faults on execution. Fault model analysis is manual documentation design for dependency layering to show how a fault in one or more dependencies propagates through a system. For example, dependency can be modeled on SQL, as non-critical, which means that a failure in SQL should not inherent failures. In this regard, any analysis should not consider failure in the SQL component as the likely cause of a service failure.

Deployment time collection (e.g., name resolvers) supports mapping a particular deployment to a service type (e.g. Tenant_Serivce_Alpha_01 instance is part of logical Tenant Service_Alpha) and remapping names (e.g. deployment GUIDs to names). Deployment time collection also supports downloading and parsing deployment artifacts to collect statically declared dependencies. Statically declared dependencies can include the specific instantiation of a dependency from a first service to a second service to a first service instance to a second service instance. In this regard, if a plurality of instances exists several individual dependencies can be deduced. Static design time tool may only provide dependency at a service level while deployment and runtime tools provide service instance level dependencies. Deployment time collection further supports collecting physical inventory of clusters and logical inventory of virtual machines and internet protocol addresses (VMs/IPs). Deployment time collection can include TFS and datacenter settings (e.g., a datacenter.xml file). Runtime collection supports discovering dependencies of services as they are performing operations based at least in part on the network traffic between them. It is contemplated that the communication between services can be directly via APIs or indirectly via an intermediary component such as a data store or an event system. Runtime collection can include tenant configuration (SVD) and distributed computing infrastructure events. The dependency service manager 310 can operate to crosscheck the data or dependency information in data sets (e.g., a table) populated by the collectors. The dependency service manager 310 generates relations between tenants and resources.

As shown in FIG. 3A, the dependency service manager 310 operates with a plurality of external components. A data store (e.g., dependency database 350) can store dependency data or dependency information and support data processing functionality supported by the service and the frontend 352 can communicate with the data store and support communicating the information for display via a display. A data store can operate based on APIs to provide the functionality described herein. In embodiments, the distributed computing infrastructure may include an on-premise infrastructure 354. The on-premise infrastructure can be for a client of the distributed computing infrastructure, a remote infrastructure for access to the dependency service, or an off-premise high availability and disaster recovery infrastructure. The on-premise infrastructure can include a dependency database on-premise 356 and a frontend on-premise 358, where the databases on-premise is synced to contain up-to-date information of the dependency data and communicate the dependency data via the frontend on-premise.

With continued reference to FIG. 3A, standard name provider 330 is responsible for correlating different naming conventions across services into a normalized form. The standard name provider 330 component can operate to take input data from different types of agents (e.g., runners) and outputs a standard name. In one exemplary implementation, the standard name provider 330 uses a workflow that includes the following: the standard name provider 330 receives a request from a collector, the request from a collector of a specific type queries the standard name provider 330 using data collected by the collector. The standard name provider 330 then outputs a standard name of the targeted dependency service tenant; and the collector uses the standard name to update the dependency service tenant's metadata information. Metadata information can be provided via the dependency service interface as discussed in more detail herein.

A collector can retrieve data items that are used to request a standard name from the standard name provider. A collector can retrieve different types of data items for a particular service. One or more of the data items retrieved can be specifically used for lookups for each type of collection. For example, in Table 1 below, Table 1 illustrates different collector types and collected data (e.g., input data) that are used for retrieving a standard name. The data items highlighted can be used for lookups in order to get the standard name. MDS collectors can use the TenantID, the SVD collectors can use both the TenantID and VIP, and the DNS collectors can use the VIP and Timestamp.

TABLE 1

| Collector Type | Input Data |
| --- | --- |
| MDS | TenantID*, ScaleUnit, ServiceName, RoleInstances, Timestamp |
| SVD | TenantID*, VIP* |
| DNS | DNS name, VIP*, Timestamp* |

In this regard, the standard name provider operates to lookup a standard name based on data provided by the collectors. Standard name provider may use different data structures for lookup purposes in order to find the standard name. In an exemplary embodiment, the standard name provider 330 uses a table (e.g., standard name table). In addition to using the standard name table for lookups and logic, the table, or corresponding data structure for lookups and logic can also be used for dependency service tenants and role lookups.

An exemplary standard name table is illustrated below in Table 2. The standard name table can be configured to allow duplicated records (e.g., same combination of Name and Type). With this configuration, the dependency service can provide different views of the same dependency service tenant from different runner's point of view. For example, Tenant WaTaskSN1 is upgraded with a new VIP 200.1.4.6 instead of 200.1.3.5. The collector for SVD has this upgrade information, and inserts a new record (i.e., VIP|200.1.4.6|WaTaskSN1|2013-07-04 11:05:17|) as shown below in Table 2. The TimeStamp column can indicate the freshness of the data. Based on that, a garbage collection or cleanup logic can be implemented to delete records that are stale maintained by a daemon thread. The lookup logic is based on a combination of Kind and Value, where the combination of Kind and Value is advantageously unique.

TABLE 2

| Kind (Primary Key) | Value (Primary Key) | Name | TimeStamp |
| --- | --- | --- | --- |
| VIP | 200.1.3.5 | WaTaskSN1 | 2013-07-03 17:05:17 |
| TenantID | 0xabc | WaTaskSN1 | 2013-07-03 17:05:17 |
| VIP | 200.1.4.6 | WaTaskSN1 | 2013-07-04 11:05:17 |

Once the SVD runners get the standard name, it can update metadata in table "TenantMetadataEntities". By way of example, the table "TenantMetadataEntities" can look as shown in Table 3:

TABLE 3

| Name | Key (Primary Key) | Value (Primary Key) |
| --- | --- | --- |
| WaTaskSN1 | VIP | 200.1.3.5 |
| WaTaskSN1 | TenantID | 0xabc |
| WaTaskSN1 | DeploymentID | 111 |

The dependency management system 300 can also support an artifacts table that stores a plurality of objects defined in the dependency management system. An exemplary artifact can be a component of a dependency service, where the attributes of the component are captured in the artifact table. For example, as shown in Table 4, the component name is WaTask and the corresponding attributes of WaTask can be populated into the table. In particular, the "RelativePath" column in the artifacts table can be the standard name and uniqueness is forced on this column.

TABLE 4

| ArtifactId | TimeStamp | Component Name | Kind | RelativePath | Weight | Label | ComponentVersion |
| --- | --- | --- | --- | --- | --- | --- | --- |
| | | WaTask | Tenant | WaTaskSN1 | | | |

The dependency management system includes several different types of collectors. Collectors can be deployment time, design time, or runtime based collectors. Several collectors within each category may further be designated as MDS related collectors, standard name collectors, MDS dependency collectors, and SVD based collectors. In particular, the one or more runtime-based collectors may include: MDS related collectors (e.g., standard name collectors, MDS dependency collectors), SVD based collectors. MDS related collectors can provide a baseline set of information for runtime dependency collection. The collectors running within MDS are done using different platforms or services (e.g., runner, watchdog, plugin, rules or embedded services) depending on the needs.

Figure 3B:
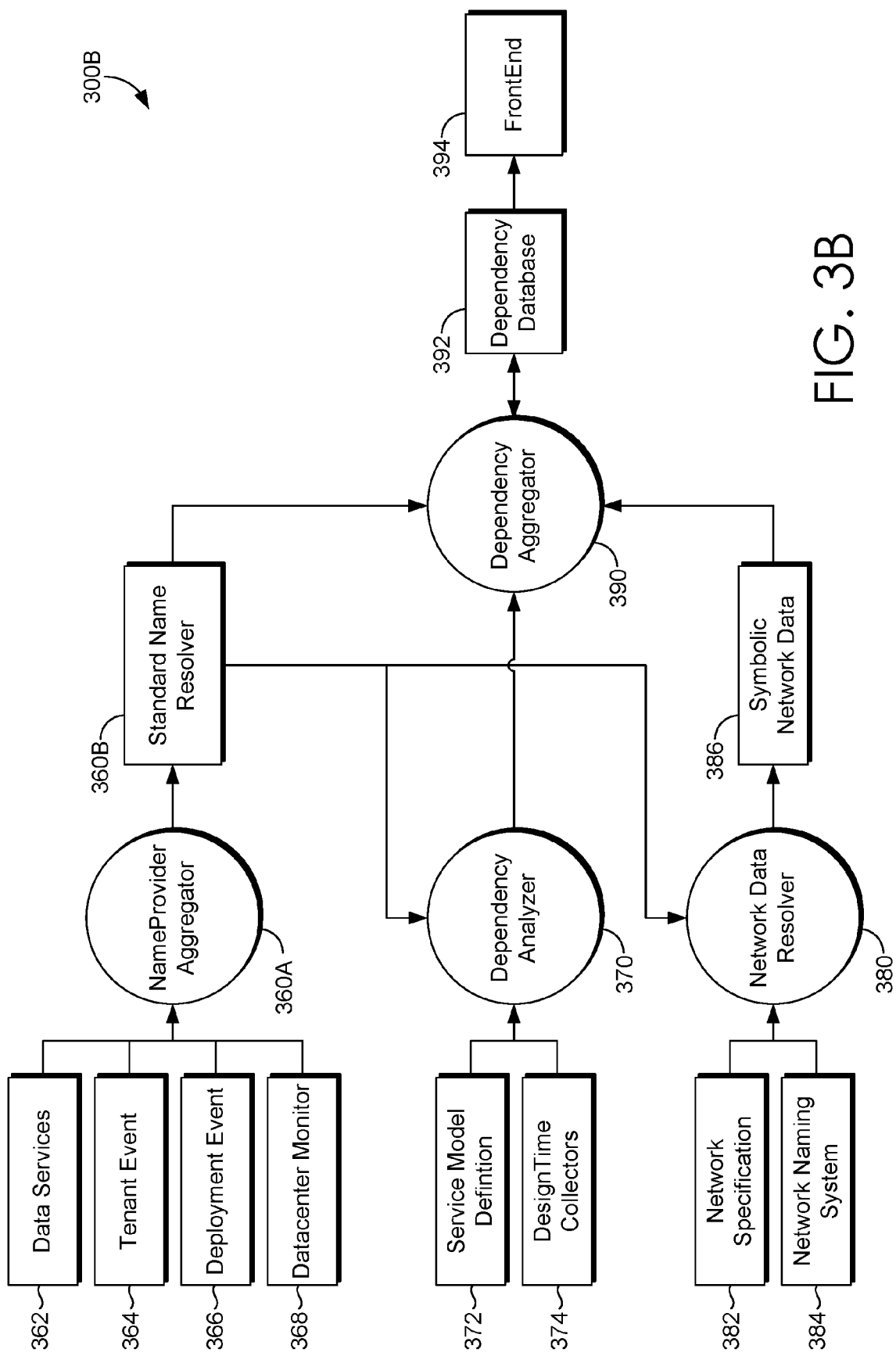
FIG. 3B is a block diagram of an exemplary dependency management process flow, in accordance with embodiments described herein.

With reference to FIG. 3B, FIG. 3B illustrates a data aggregation mechanism that is implemented using a dependency service manager. At a high level, the data aggregation mechanism includes a name provider aggregator 360A and a standard name resolver 360B, a dependency analyzer 370, a network data resolver 380 and a symbolic network data 386. The above-recited components are operationally coupled to dependency aggregator 390 which communicates with the dependency database 392 and frontend 394. In combination, the components support dependency aggregation and dependency data communication in the dependency management system.

The name provider aggregator 360A is associated with a plurality of standard name collectors (e.g., data services 362, tenant events 364, deployment events 366, datacenter monitor 368). The standard name collectors can operate as a first layer of collectors. The first layer of collectors uses various types of information to build an IP (VIP or DIP) to stable dependency service tenant name mapping. The standard name service provides a stable platform to normalize the names and dependency service tenant information for any further correlation or annotation. A standard name collector can be implemented in one embodiment as a runner (e.g., MA list, CS) and rules (e.g., event processing) to generate the stable list of names and the current set of IP to standard name mappings.

The standard name collectors monitor different types of events. For example, MDS monitoring agents, hardware and software components, frontend, and tenant deployment and update events. This provides a list of known dependency service tenants and their current VIP allocations to be used for dependency resolution. The CS collector monitors for datacenter inventory changes (through monitoring of CS changes) and assigns names to hardware entities like clusters, racks, power distribution unit, top of rack switch, etc. These items also allow future construction of a physical view and allocations.

A second layer of collectors can include MDS dependency collectors. An MDS based collector updates the dependency graph by converting raw network events (e.g., WINDOWS socket events) into a symbolic stable version. The network data resolver 380 can operate as a filter and can leverage the standard name provider to resolve a particular IP address to a service dependency, raise the Winsock/DNS event and result in updating the service-to-service dependency when the events are processed. As shown in FIG. 3B, MDS dependency collectors include network specification 382 (e.g., Winsock/DNS) and network naming system 384 (e.g., DNS service) that operate in combination with the standard name resolver 360B (i.e., dynamic name resolution information) to update dependency data based on network events. In this stage, the network data resolver 380 aggregates data from specific machine instances, so it provides an aggregate view of the dependency rather than individual machine information. The network data resolver 380 operates to provide a mapping of a name (e.g., account.blob.storage.cloud-service.com) to an IP address. In this regard, the network data resolver 380 provides more granular information of specific storage accounts (or other names) to an IP to enable correlation at a fine-grained level and correlation of dependencies and services through an intermediate storage account or other event system or mechanism. For example, if service A and service B both use account ABQueue.queue.cloud-service.com, the dependency service system thus provides information that service A and B depend on queue.cloud-service.com, but also service A and B depend on each other. Even though service A and B may not directly communicate.

SVD based collectors (e.g., service model definition 372) can operate based on service model definitions to collect data that is used to generate dependency data. By way of background, a service model can refer to a template which can be used to create instances of a service and includes several different elements (e.g., Service, Role, Group, Channel, Topology, and hosting environment). For example, Service: Structured set of Roles, groups, and channels, describing a type of service. The service presents a set of configuration settings (which must be bound to particular values for deployment), a series of input interfaces (constituting its Contract), and a series of dependencies on the interfaces of other service contracts.

Component: each independently scalable unit, of which it can be either a Role or a Group. Role: Each type of component of a Service, a type of program, designed to be multiple instantiated. Group: Set of other Groups, Roles and channels. The minimal group is a Role. Enables the instantiation of a predefined set of roles and channels.

Channel: establishes connections between groups, relating the instances in various ways (e.g. load balancer, stateful and stateless switch channels).

Topology: description of the Service's structure (groups, roles, channels and associated interconnect, affinity among Roles, etc.)

Hosting Environments: Runtime needed by a Role (e.g., a particular OS SKU)

Each tenant of the distributed computing infrastructure can be created or updated with a corresponding SVD file and the SVD file contains the service model definition of the service and some settings that imply references to other services. The SVD and operation model, especially if regulated or standardized, can be leveraged by using heuristics and advocating proper guidelines. In this regard, the service model definition can include objects in the definitions that can be identified by a collector and then used to generate dependency data. The dependency collector can discover most dependencies before the dependency service tenant actually runs. Identifying dependency data based on an SVD can be based on one or more of the following: an input endpoint of SVD; the specification of SVD where the input endpoint is declared for the reference with other services; the name of setting follows a well-known naming convention; and the value of the setting matches a certain well-known pattern (e.g., a DNS name). In one example, a collector can generate a dependency reference to data using an XML representation. As such, the collector can resolve the storage account (storage_account_alpha) to a specific VIP (IP_storage_account_alpha) and the source of the dependency. The overall dependency can include pointing to the dependency to a storage component and the name of the storage component.

With continued reference to FIG. 3B, design time collectors (e.g., design time collectors 374) operate to capture an intent of a user (e.g., a service administrator) using a symbolic representation. The symbolic representation allows stronger inferences to be made from runtime dependencies (non-accidental) and detect dependencies that are not constantly in-use. The design time collection model allows more attributes including: dataflow direction, the FMA plane, priority of dependency by business impact, expected design time dependency (e.g., a frontend depends on a location service, storage infrastructure, operations hardware or software infrastructure or SQL servers and services). The design collection model can be represented in XML. In particular, the representation of the design time collections is indented to capture the developer-provided information and prioritize the dependencies found at runtime. The multiple collectors are used to transform other dependency tracking tools information (e.g. LayerMap, ALMap, package analysis) into a common format. LayerMap can refer to declarative layering between portions of the software stack to ensure proper pattern of references. The LayerMap can be used within an operating system to ensure code in higher portions of the operating system only reference appropriate portions of that are lower and there exist no reference in the other direction (i.e., lower to higher). ALMap refers to design for FMA to document the layering diagram across service within a cloud operating system rather than a classic OS. Package analysis can refer to using the existing packages (e.g., NuGet, cspkg) and opening their content or dependency listing to understand what other service may be utilized. The benefits of design time collectors is that the design time collectors are typically less noisy and require low processing cost.

With reference to deployment collectors, the deployment collectors are designed to monitor deployment information to be able to have additional metadata about deployments (when, where, who) and trigger refresh of the parsing logic to have immediate update to the data. The TFS collector automatically enumerates dependencies and dependents of distributed computing infrastructure from TFS records. A TFS source code manager including automated builds of code amongst other functionality. TFS collector data helps classify the tenants into service groups and associate with the component team. The CS collector enumerates configuration data stored within CS configuration store to collect current settings used for deployment prior to deployment transformation (symbolic instead of specific). It also can collect the hardware location/IPs/assignment to map from specific hardware/VM to cluster information. The storage of this information in the CS is only an exemplary implementation and is not meant to be limiting. In another exemplary embodiment, the data can be stored in other data stores or data structures, such a production hardware management service.

With reference to FIG. 3B, the dependency aggregator 390 is operationally coupled to standard name resolver 360B for dynamic name resolution, symbolic network data 386, the dependency analyzer 370 that provides service model definitions and design time collector data. During an aggregation process, the dependency aggregator retrieves data from the collectors and stores the dependency data in a dependency database 392 that supports communicating the dependency data to the frontend 394. The dependency database 392 can also support communicating the dependency data to a Web-API Service to enable programmatic access to retrieve the data to enable automatic recovery operations rather than display the data on a Portal for users to parse through. It is contemplated that the dependency database 392 and frontend 394 can be synced with an on-premise infrastructure. Many core components support multi-tenancy, which cause the core components to initialize network traffic on-behalf of dependency service tenants.

Table 5 is an illustration of the different types of collectors. The following table further summarizes the data collected from each of the collectors mentioned above:

Symbols: [DEPENDS_ON] indicates a Dependency,—a coupling where one object operates based on functions of another—and [CONTAINED_IN] indicates Contained—when a particular item is part of a larger concept. For example, a blade is part of a rack, rack is part of a datacenter. A role can be a part of a service.

The dependency management system further supports manual editing. Although a majority of the dependency information can be automatically deduced and correlated using components described herein, the user may still need to modify and annotate the information. For this purpose, the dependency service interface (e.g., portal) supports an additional editing experience. For example, a component team can upload the designed dependency through the portal or the underlying data service.

Advantageously, the component team can document all the service references so services are properly categorized. When there is a runtime-detected dependency, a component team member can define the FMA plane and direction of a flow edge. The dependency management system can also operate to capture inputs in a central location. Capturing inputs in a central location ensures the service owner editing experience is smooth. The component team can develop a review process, so the changes can reflect back to the component team's source code, and the dependency is properly advocated.

The dependency service interface via a portal, for example, can further enable user to correlate an un-resolved communication target with a service or a properly categorized node like internal DNS server etc. The dependency management system aggregates a number of sources to generate the dependency graph that is updated periodically. The different collectors retrieve and communicate data from a number of sources to collect the information on platform tenants, group them into services and associate them with a component team. The collectors are configured to collect information from variety of sources (code, config, runtime, and deployment information) the distributed computing infrastructure, including a cloud computing platform and on-premise infrastructure. The aggregated data can be stored in multiple locations for high-availability in case of disaster recovery (DR) and maintained within reasonable freshness

TABLE 5

| Collector | Type | Data |
| --- | --- | --- |
| LayerMap | Design | Binary[CONTAINED_IN]Role ( ), |
| Static dependency analysis | Design | Binary[CONTAINED_IN]Package (automatic) |
| ALMap (FMA) | Design | Role[DEPENDS_ON]Role(semi-manual), Service[DEPENDS_ON]Service (semi-manual) |
| CS | Deployment | Blade[CONTAINED_IN]Rack, Rack[CONTAINED_IN]Cluster, Cluster[CONTAINED_IN]DC Service(Core)[CONTAINED_IN]Cluster, Utility Machine's Metadata (e.g., location, IP) |
| TFS | Deployment | Component[CONTAINED_IN]Team Deployment (Version, Service, Build) |
| SVD retrieval | Runtime | Service[DEPENDS_ON]Account (setting) Service metadata(Build[VHD]) |
| FC/RDFE polling | Runtime | FC Service[CONTAINED_IN]RDFE Service Service metadata (Name, VIP) Account [DEPENDS_ON] Service |
| MDS: Frontend/ Infrastructure Events | Runtime | FC deployments |
| MDS: Winsock | Runtime | Role[DEPENDS_ON]Role, Role/Service[DEPENDS_ON]Service/ |
| MDS: DNS | Runtime | Role[DEPENDS_ON]Account | at all locations. The dependency management system 300 operates to monitor the staleness of any data to ensure it is providing a consistent view with the real world.

The dependency management system 300 also supports reliability and maintenance framework. The dependency management system 300 can include a recovery dependency services UI. The recovery dependency can be redundant to provide information independent of potential failures. In one embodiment, the recovery dependency services are located both on premise and within the cloud computing platform to provide redundancy to local and regional failures. The dependency management system 300 can utilize synchronization technologies to ensure both locations are kept updated in reasonable time.

Advantageously, the processing pipeline is located within the cloud computing platform to utilize the scalability and low-maintenance of the cloud environment. The plurality of collectors access resources as part of existing pipelines (e.g. CS replication, cloud computing platform analysis). The processing pipeline utilizes the existing monitoring technologies (MDS) to monitor health, alarm for pipeline problems and monitor pipeline KPI.

The dependency management system can support a dependency data layer. The dependency data layer can be implemented based on a dependency graph or other graphical representation as described hereinabove. The dependency graph or data graph can include nodes and edges associated with a failure recovery mechanism that is implemented via the dependency management system. In an embodiment having the dependency graph, nodes in the dependency graph are the unit of recovery operation and dependency display for operator or developer. Some of the major nodes of interest are the service instances (tenants) endpoints, and utility machines (e.g., jump boxes to bootstrap services). Because recovery action needs to be presented in a human manageable way, the granularity of the recovery graph typically shows dependency tenant level artifacts. The smaller-resources (e.g., storage, machines) can be highlighted for potential recovery actions, but are not required for full pivoting options. The edges of the graph are directional; the information flows direction is critical for recovering order. The edge of the graph can contain the failure model of the service, e.g. runtime plane, management plane, monitoring plane or control plane. The edge contains weight which reflects the importance of the link (first order of approximation will be traffic volume, but other measures may be used).

The dependency data layer further includes a node naming mechanism. The node in the graph can be configured with a global id, which follows a standardized taxonomy. The approach can be used to identify a node by a hierarchy. The hierarchy can be by the logical service ownership or by the physical location. Further, the node can be identified by convention hierarchy, for example, Storage Account Access: Component/Tenant/AccountName/dnsName; Tenant:Component/Tenant; RoleInstance:Component/Tenant/RoleName/RoleInstance; and Blade:DataCenter/Cluster/Rack/Blade. By convention. the nodes (components, tenant, role, binaries, and source/configuration files) can have a stable Uniform Resource Identifier (URI). The URI's segments contain component name (ComponentName), the type of the artifacts (Kind), and relative path to the artifact (RelativePath). The relationship edge still can have detailed version, so the client can selectively merge the information. The dependency data layer can further be presented in a graphical representation (e.g., dependency graph). The dependency graph can be used in both batch uploading and an end-user browsing scenarios. The information can be encoded in various formats to address functional and performance requirement for different scenarios.

Figure 3C:
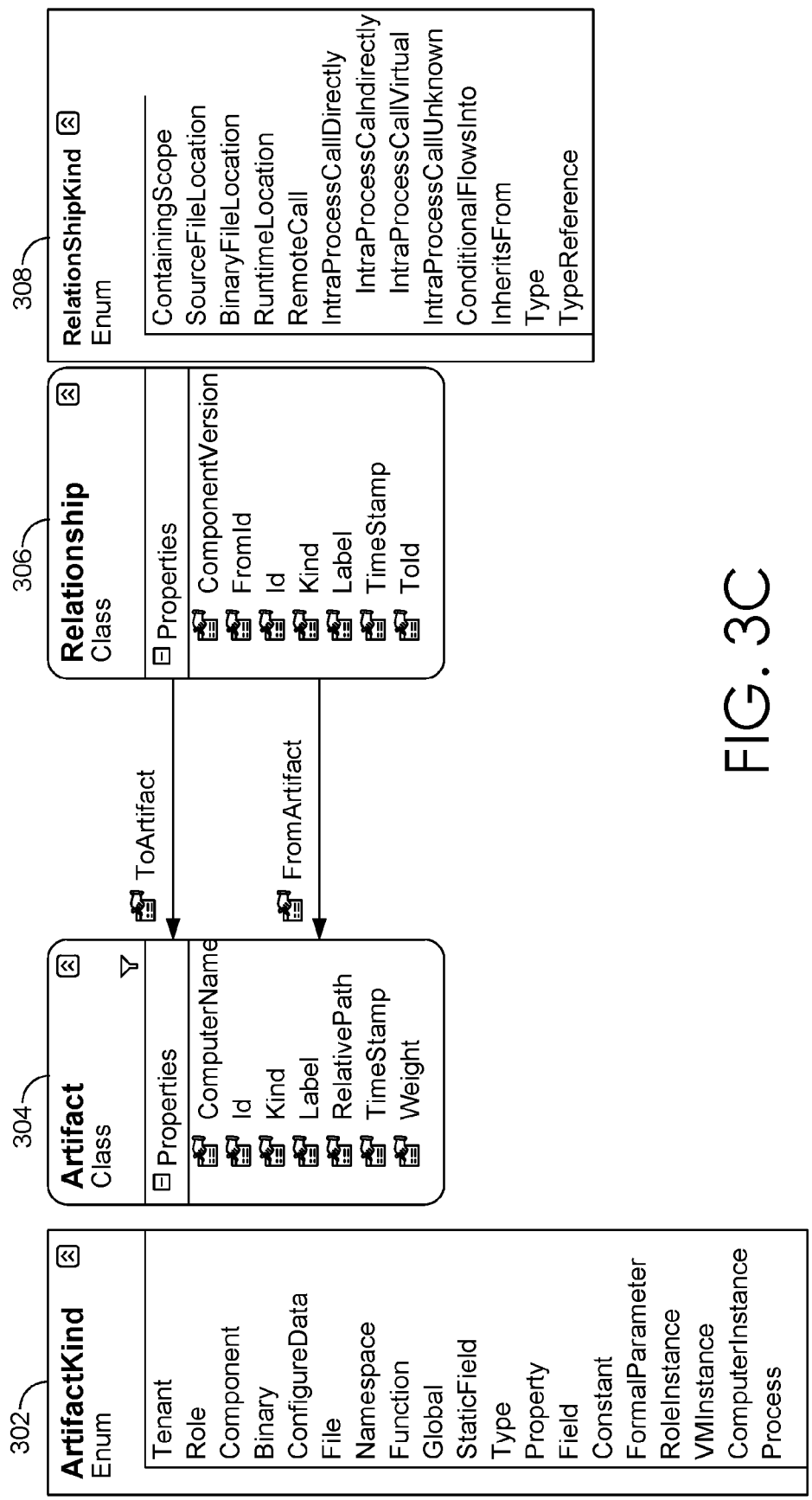
FIG. 3C is an illustration of an exemplary artifact and relationship logic of dependency service tenants, in accordance with embodiments described herein.

The dependency data layer further includes Artifact/Relationship to capture the common data contract to exchange dependency information. As shown in FIG. 3C, exchanged of dependency information can be based on a dependency graph logic format between Artifacts and Relationships (e.g., ArtifactKind 302 and Artifact 304 and Relationship 306 and RelationshipKind 308) and their corresponding attributes. Various services can exchange dependency information in binary, xml and other format as appropriate to the scenario.

With continued reference a graphical representation supported via the dependency data layer, a node and an edge can carry a set of properties, with some well-known properties indexed for faster search. The following are example label for user-friendly names. Kind to classify the node or link and simplify search experience. ComponentName: the logical name for the service. RelativePath: The unique path identifies the node in this component and kind. Weight help clients sort the information by importance. LastUpdateTime for the last time, the information was updated, so the collector can cache old information, execute an incremental update, and retire the old record. Examples of kind, component names and relative paths are illustrated in table 6 below.

TABLE 6

| Kind | ComponentName (not null) | RelativePath (not null) |
|---|---|---|
| Component | Service's Name | Service's Name |
| Tenant | Service's Name (Parent's Name) | Tenant's Name |
| Role | Service's Name (Parent of Parent's Name) | Tenant's Name/ Role's Name |

The dependency data layer can provide an additional data service, which can query the attributes like the following. Each type of node can have a different kind of property set, like service node have deployment id, service model etc. The graph's main storage can be a SQL data source, the database is backed up on-premise to provide disaster recovery availability. In one exemplary implementation, which is not meant to be limiting, the dependency data layer can map the entity model into the tables in SQL database with the use of the Entity Framework to simplify maintenance. The dependency data layer may also provide functionality to upload/download a slice of the graph in a file as xml/dgml/etc.

The dependency management system 300 can provide support for indirect dependencies. Additional dependency processing can be done to detect the indirect dependencies between dependency service tenants. For example, an indirect dependency can refer to a dependency that uses storage, service bus, SQL as a communication channel. In this regard, the dependency is not only for one service on the 'channel' (the service providing communication—e.g. Storage) but also between the two services. These dependencies are harder to detect because direct communication may not exist between the two services. In this case, the communication channel (storage) will utilize the same account/queue/table names and both services will read/write to these locations. By using the dependency analysis down to the exact accounts, it is possible to infer this dependency by looking for having the same account utilized by multiple services. The indirect dependency discovery mechanism can detect co-dependence between two dependency service tenants. The automated analysis can flag these dependencies for further processing so component teams could be required to declare them.

The dependency management system 300 can also support normalization. By way of example, if the dependency management system using raw dependency service tenant name as in "Fabric," the dependency data layer has to perform unnecessary operations with fragile binding. The dependency management system provides a mechanism to standardize common dependency service tenant names in the distributed computing environment. Data can be aggregated appropriately toward underlying logic entity that reflects both service name and the scale unit name. A naming convention guidance can be provided for component teams, so the dependency analyzer can automatically recognize their dependency service tenant's stable name.

Figure 4:
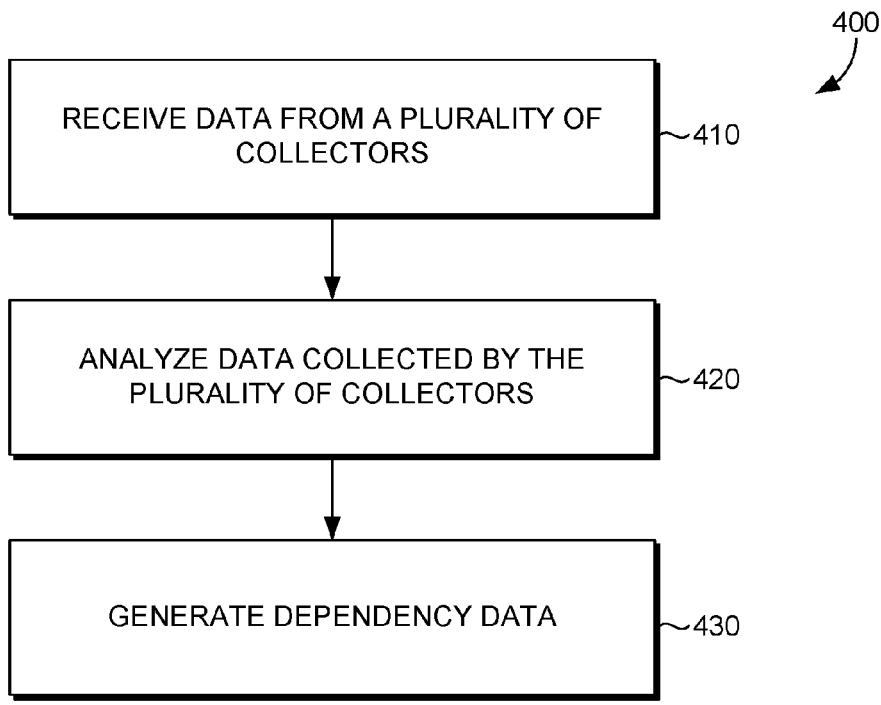
FIG. 4 is a flow diagram showing an exemplary method for providing a dependency management system, in accordance with embodiments described herein.

Turning now to FIG. 4, a flow diagram is provided that illustrates a method 400 for providing dependency management. The method can be performed using the dependency service manager described herein. Initially at block 410, data from a plurality of collectors is received. The collectors access data, based on, a collection time attribute associated with a corresponding collector, the collection time attribute is selected from one of the following: design time collection; deployment time collection; and runtime collection. The collectors retrieve and update data of dependency service tenants based on a corresponding collection time attribute. Design time collection includes identifying developer-provided dependency information that supports identifying dependencies and dependents of dependency service tenants. Deployment time collection includes mapping deployment services to dependency service tenants based on monitoring deployment operations of a distributed computing infrastructure of the dependency management system. Runtime collection includes identifying dependencies of dependency service tenants as operations of the dependency service tenants are being performed based at least in part on network traffic communicated between components. In embodiments, at least portions of the data are communicated to a standard name provider that uses the portions of the data to lookup or generate a standard name for a dependency service tenant.

At block 420, the data collected by the plurality of collectors is analyzed to crosscheck and generate relations between dependency service tenants and corresponding dependency and dependent components. Analyzing can include processing the data from the collectors then generate the dependency data. At block 430, upon analyzing the data, dependency data is generated, the dependency data comprising dependencies and dependents associated with the dependency service tenants of a dependency management system. Generating dependency data is based on implementing a dependency aggregation mechanism to retrieve data based at least in part on service model definitions and heuristics defined for identifying dependency service tenants based on the service model definitions. Generating dependency data is also based on implementing a dependency aggregation mechanism using a first layer of collectors for building a dependency service tenant to name mapping and a second layer of collectors for providing a dependency data representation of network events. The method can further include communicating the dependency data to support access to the dependency data based on a dependency service interface and a data graph representation, the dependency service interface comprising a logical view interface having at least two selectable views that support presenting and accessing dependency data and the data graph representation comprising nodes and edges associated with a failure recovery mechanism.

Figure 5:
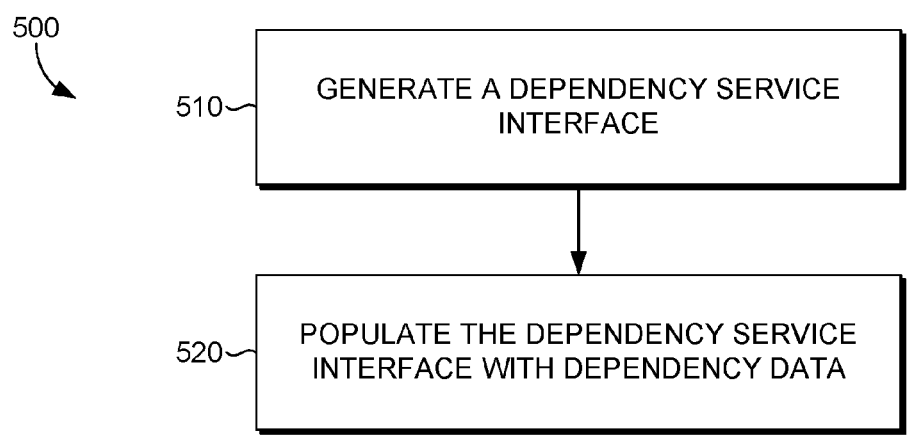
FIG. 5 is a flow diagram showing an exemplary method for providing a dependency management system interface, in accordance with embodiments described herein.

Turning now to FIG. 5, a flow diagram is provided that illustrates a method 500 for providing dependency management. Computer storage media having computer-executable instructions embodied thereon that, when executed, by one or more processors, causes the one or more processors to perform the method for dependency management. At block 510, a dependency service interface is generated. The dependency service interface includes a logical view interface having at least two selectable views that support presenting and accessing dependency data. The dependency data is generated based on data from a plurality collectors, dependency data includes dependencies and dependents associated with tenant services of a dependency management system. The plurality of collectors, accesses data, for generating the dependency data, based on a collection time attribute associated with a corresponding collector, the collection time attribute is selected from one of the following: design time collection; deployment time collection; and runtime collection. At block 520, the dependency service interface is populated with dependency data generated from the data retrieved by the plurality of collectors.

A first selectable logical view of the logical view interface is a dependency by service view that supports viewing failures of tenant services, and a second selectable logical view of the logical view interface is a dependency by location view that supports viewing failures of tenant service locations. The dependency service interface further comprises dependency search bar, the dependency search bar supports searching for tenant services, where incoming relations and outgoing relations are populated on the dependency service interface based searches performed using the dependency search bar. It is contemplated that it is possible to present more views of dependencies, such as filters by location, current health of services or location. Further, views can be integrated with other data source, such as, compliance, health, error rates, current network load and CPU load to provide a more comprehensive and integrated view of the dependency data. Advantageously, the different additional views enrich the dependency graph and other health models of the distributed computing system.

The dependency service interface operates based on APIs that support querying and retrieving dependency data based at least in part on automated access to a data graph representation of the dependency data, the data graph representation comprising nodes and edges associated with a failure recovery mechanism.

The dependency service interface further operates as a portal for viewing dependency data, wherein the portal further supports providing access to a data graph representation of the dependency data, wherein nodes in the data graph representation are associated with recovery actions and edges indicate a failure model of the corresponding dependency service tenant.

With reference to the dependency management system, embodiments described herein support configuring, discovering, and communicating dependencies between services in a distributed computing system. The dependency management system components refer to integrated components for managing dependencies. The integrated components refer to the hardware architecture and software framework that support data access functionality using the dependency management system service platform. The hardware architecture refers to physical components and interrelationships thereof and the software framework refers to software providing functionality that can be implemented with hardware operated on a device. The end-to-end software-based dependency management system service platform can operate within the dependency management system service platform components to operate computer hardware to provide dependency management system service platform functionality. As such, the dependency management system service platform components can manage resources and provide services for the dependency management system functionality. Any other variations and combinations thereof are contemplated with embodiments of the present invention.

By way of example, the dependency management system platform can include an API library that includes specifications for routines, data structures, object classes, and variables may support the interaction between the hardware architecture of the device and the software framework of the dependency management system service platform system. These APIs include configuration specifications for the dependency management system platform system such that the driver component and component therein can communicate with each other in the dependency management system service platform, as described herein. In particular, APIs can support external services (e.g., health monitoring, compliance review, etc.) to retrieve dependency information.

Figure 6:
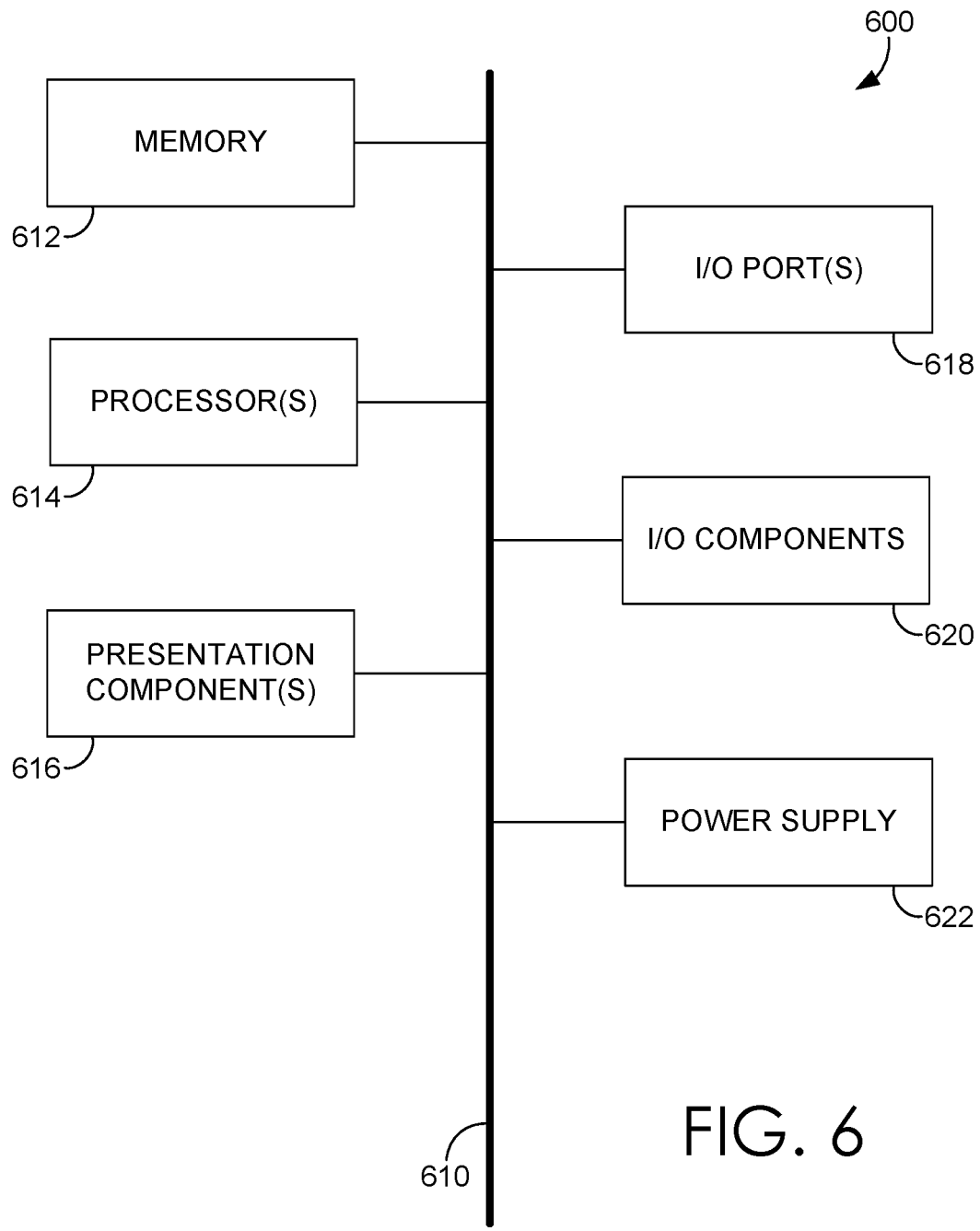
FIG. 6 is a block diagram of an exemplary computing environment suitable for use in implementing embodiments described herein.

Having briefly described an overview of embodiments of the present invention, an exemplary operating environment in which embodiments of the present invention may be implemented is described below in order to provide a general context for various aspects of the present invention. Referring initially to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes a bus 610 that directly or indirectly couples the following devices: memory 612, one or more processors 614, one or more presentation components 616, input/output ports 618, input/output components 620, and an illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc.

Figure 7:
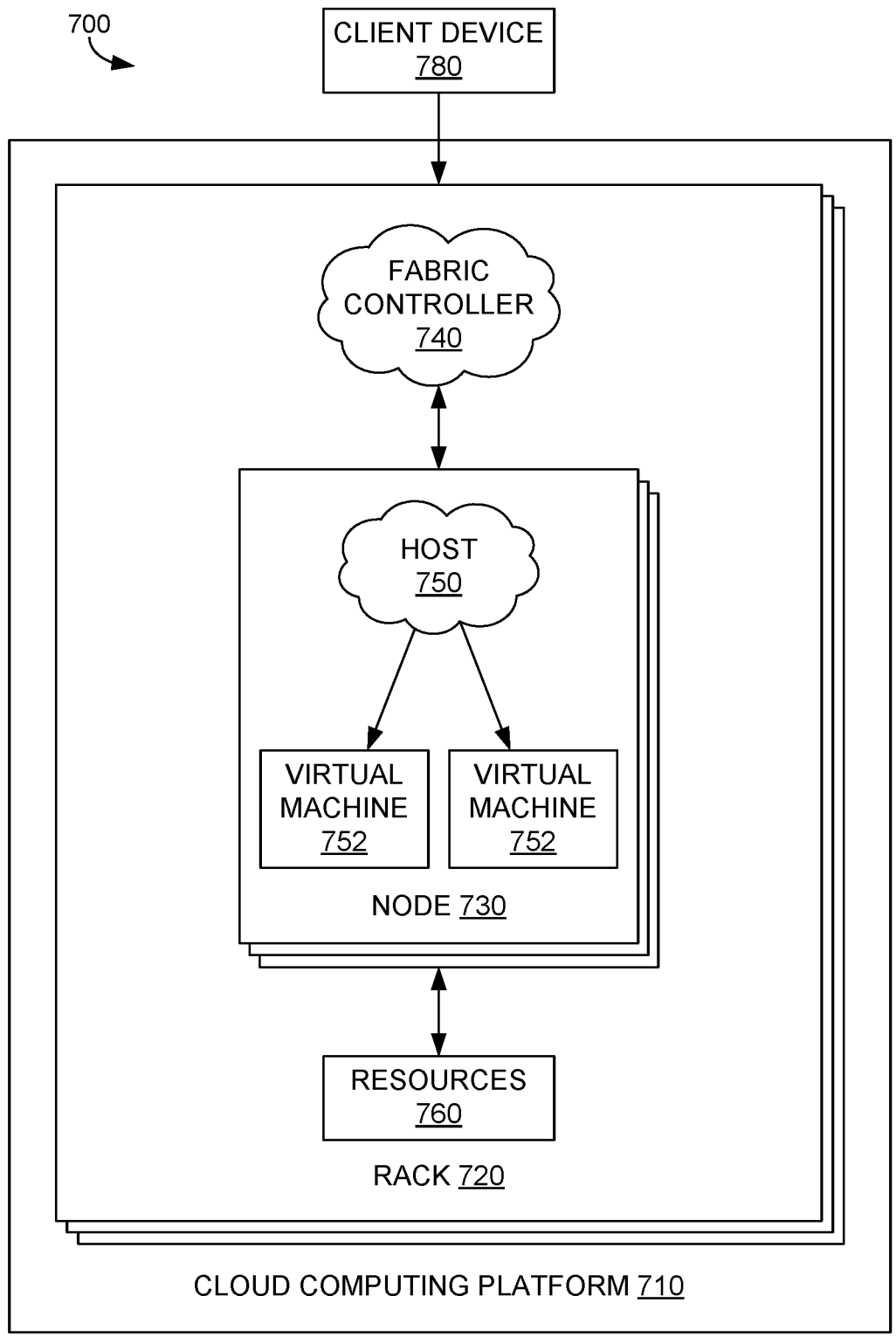
FIG. 7 is a block diagram of an exemplary computing environment suitable for use in implementing embodiments described herein.

Referring now to FIG. 7, FIG. 7 illustrates an exemplary distributed computing environment 700 in which implementations of the present disclosure may be employed. In particular, FIG. 7 shows a high level architecture of the dependency management system ("system") in a cloud computing platform 710, where the system supports seamless modification of software component. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Data centers can support the distributed computing environment 700 that includes the cloud computing platform 710, rack 720, and node 730 (e.g., computing devices, processing units, or blades) in rack 720. The system can be implemented with a cloud computing platform 710 that runs cloud services across different data centers and geographic regions. The cloud computing platform 710 can implement a fabric controller 740 component for provisioning and managing resource allocation, deployment, upgrade, and management of cloud services. Typically, the cloud computing platform 710 acts to store data or run service applications in a distributed manner. The cloud computing infrastructure 710 in a data center can be configured to host and support operation of endpoints of a particular service application. The cloud computing infrastructure 710 may be a public cloud, a private cloud, or a dedicated cloud.

The node 730 can be provisioned with a host 750 (e.g., operating system or runtime environment) running a defined software stack on the node 730. Node 730 can also be configured to perform specialized functionality (e.g., compute nodes or storage nodes) within the cloud computing platform 710. The node 730 is allocated to run one or more portions of a service application of a tenant. A tenant can refer to a customer utilizing resources of the cloud computing platform 710. Service application components of the cloud computing platform 710 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by the nodes 730, the nodes may be partitioned into virtual machines (e.g., virtual machine 752 and virtual machine 754). Physical machines can also concurrently run separate service applications. The virtual machines or physical machines can be configured as individualized computing environments that are supported by resources 760 (e.g., hardware resources and software resources) in the cloud computing platform 710. It is contemplated that resources can be configured for specific service applications. Further, each service application may be divided into functional portions such that each functional portion is able to run on a separate virtual machine. In the cloud computing platform 710, multiple servers may be used to run service applications and perform data storage operations in a cluster. In particular, the servers may perform data operations independently but exposed as a single device referred to as a cluster. Each server in the cluster can be implemented as a node.

Client device 780 may be linked to a service application in the cloud computing platform 710. The client device 780 may be any type of computing device, which may correspond to computing device 700 described with reference to FIG. 7, for example. The client device 780 can be configured to issue commands to cloud computing platform 710. In embodiments, client device 780 may communicate with service applications through a virtual Internet Protocol (IP) and load balancer or other means that directs communication requests to designated endpoints in the cloud computing platform 710. The components of cloud computing platform 710 may communicate with each other over a network (not shown), which may include, without limitation, one or more local area networks (LANs) and/or wide area networks (WANs).

Having described various aspects of the distributed computing environment 700 and cloud computing platform 710, it is noted that any number of components may be employed to achieve the desired functionality within the scope of the present disclosure. Although the various components of FIG. 7 are shown with lines for the sake of clarity, in reality, delineating various components is not so clear, and metaphorically, the lines may more accurately be grey or fuzzy. Further, although some components of FIG. 7 are depicted as single components, the depictions are exemplary in nature and in number and are not to be construed as limiting for all implementations of the present disclosure.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where configured for comprises programmed to perform particular tasks or implement particular abstract data types using code. Further, while embodiments of the present invention may generally refer to the head-mounted display unit and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A system for implementing dependency management, the system comprising:
   a plurality of collectors configured to:
   access data, for generating dependency data, based on a collection time attribute associated with a corresponding collector, the collection time attribute is selected from one of the following: design time collection, deployment time collection, and runtime collection,
   wherein corresponding design time, deployment time, and runtime are classifications of declarative artifacts and analytical operations for targeted collection of design data, deployment data, and runtime data that are analyzed to generate dependency data for tenant services; and
   a dependency service manager configured to:
   access the data collected by the plurality of collectors;
   analyze the data collected to crosscheck and generate relations between dependency service tenants and corresponding dependency and dependent components; and
   generate dependency data based on data retrieved by the plurality of collectors, the dependency data comprises dependencies and dependents associated with the dependency service tenants of a dependency management system.

2. The system of claim 1, wherein the dependency service manager further comprises a standard name provider that supports a naming convention across dependency service tenants to generate and look up standard names for dependency service tenants.

3. The system of claim 2, wherein the plurality of collectors retrieve and update data of dependency service tenants based on corresponding collection time attributes, wherein at least portions of the data are communicated to the standard name provider that uses the portions of the data to generate and look up standard names for dependency service tenants, wherein the standard name provider operates at least in part with a network naming system to update dependency data based on network events.

4. The system of claim 1, wherein the dependency service manager communicates the dependency data with a portal that provides access to a dependency service interface and a data graph representation of the dependency data.

5. The system of claim 1, wherein the dependency service manager further comprises
   a dependency aggregator that implements a dependency aggregation mechanism having a first layer of collectors for building a dependency service tenant to name mapping and a second layer of collectors for providing a dependency data representation of network events; or
   a dependency aggregator that implements a dependency aggregation mechanism for retrieving data based at least in part on service model definitions and heuristics defined for identifying dependency service tenants based on the service model definitions.

6. The system of claim 1, further comprising:
   during design time collection, design time collectors from the plurality of collectors retrieve data associated with one or more of the following: static dependency analysis, layer mapping, and fault model analysis;
   during deployment time collection, deployment time collectors from the plurality of collectors retrieve data associated with one or more of the following: team foundation service (TFS) and Configuration Store (CS); and
   during runtime collection, runtime collectors from the plurality of collectors retrieve data associated with one or more of the following: service model definitions and monitored events of a distributed computing infrastructure of the dependency management system.

7. The system of claim 1, wherein the dependency service manager transmits the dependency data to cause generation of a dependency service interface comprising a logical view interface having at least two selectable views that support presenting and accessing dependency data and a data graph representation comprising nodes and edges associated with a failure recovery mechanism.

8. A computer-implemented method for providing dependency management, the method comprising:
   receiving data from a plurality of collectors, wherein the plurality of collectors access data based on a collection time attribute associated with a corresponding collector, the collection time attribute is selected from one of the following: design time collection; deployment time collection; and runtime collection, wherein corresponding design time, deployment time, and runtime are classifications of declarative artifacts and analytical operations for targeted collection of design data, deployment data, and runtime data that are analyzed to generate dependency data for tenant services;
   analyzing data collected by the plurality of collectors to crosscheck and generate relations between dependency service tenants and corresponding dependency and dependent components;
   upon analyzing the data, generating dependency data comprising dependencies and dependents associated with the dependency service tenants of a dependency management system; and
   communicating the dependency data to cause generation of a dependency service interface having the dependency data generated from the data retrieved by the plurality of collectors.

9. The method of claim 8, wherein the plurality of collectors retrieve and update data of dependency service tenants based on a corresponding collection time attribute, wherein the standard name provider operates at least in part with a network naming system to update dependency data based on network events.

10. The method of claim 8, wherein design time collection comprises identifying developer-provided dependency information that supports identifying dependencies and dependents of dependency service tenants.

11. The method of claim 8, wherein deployment time collection comprises mapping deployment services to dependency service tenants based on monitoring deployment operations of a distributed computing infrastructure of the dependency management system.

12. The method of claim 8, wherein runtime collection comprises identifying dependencies of dependency service tenants as operations of the dependency service tenants are being performed based at least in part on network traffic communicated between components.

13. The method of claim 8, wherein generating dependency data is based on identifying indirect dependencies, wherein indirect dependencies between dependency service tenant are based on communication channels between dependency service tenant, a communication channel selectable from one of the following: a storage; a service bus; a queue; and a Structured Query Language (SQL) database.

14. The method of claim 8, wherein generating dependency data is based on implementing a dependency aggregation mechanism using a first layer of collectors for building a dependency service tenant to name mapping and a second layer of collectors for providing a dependency data representation of network events.

15. The method of claim 8, further comprising communicating the dependency data to support access to the dependency data based on the dependency service interface and a data graph representation, the dependency service interface comprising a logical view interface having at least two selectable views that support presenting and accessing dependency data and the data graph representation comprising nodes and edges associated with a failure recovery mechanism.

16. One or more computer storage media having one or more hardware processors and memory storing computer-executable instructions and components embodied thereon that, when executed, by the one or more hardware processors, cause the hardware processors to execute a method for dependency management, the method comprising:
   receiving dependency data based on data retrieved by a plurality of collectors, the dependency data comprises dependencies and dependents associated with dependency service tenants of a dependency management system, wherein the plurality of collectors access data based on a collection time attribute associated with a corresponding collector, the collection time attribute is selected from one of the following: design time collection; deployment time collection; and runtime collection,
   wherein corresponding design time, deployment time, and runtime are classifications of declarative artifacts and analytical operations for targeted collection of design data, deployment data, and runtime data that are analyzed to generate dependency data for tenant services;
   generating a dependency service interface comprising a logical view interface having at least two selectable views that support presenting and accessing dependency data, wherein the dependency data is generated based on data from a plurality of collectors, dependency data comprises dependencies and dependents associated with tenant services of a dependency management system; and
   populating the dependency service interface with dependency data generated from the data retrieved by the plurality of collectors.

17. The media of claim 16, wherein a first selectable logical view of the logical view interface is a dependency by service view that supports viewing failures of tenant services, and wherein a second selectable logical view of the logical view interface is a dependency by location view that supports viewing failures of tenant service locations.

18. The media of claim 16, wherein the dependency service interface further comprises dependency search bar, the dependency search bar supports searching for tenant services, wherein incoming relations and outgoing relations are populated on the dependency service interface based searches performed using the dependency search bar.

19. The media of claim 16, wherein the dependency service interface further comprises Application Programming Interfaces (APIs) that support querying and retrieving dependency data based at least in part on automated access to the dependency data.

20. The media of claim 16, wherein the dependency service interface operates as a portal for viewing dependency data, wherein the portal further supports providing access to a data graph representation of the dependency data, the data graph representation comprising nodes and edges associated with a failure recovery mechanism.

\* \* \* \* \*